United States Patent [19]
Dunham et al.

[11] Patent Number: 5,114,244
[45] Date of Patent: May 19, 1992

[54] COMPLIANT BEARING SURFACE WITH ENCLOSED FLUID SUPPORT

[76] Inventors: James L. Dunham; Catherine C. Cutter, both of 216 Redwood Ave., Willits, Calif. 95490

[21] Appl. No.: 754,966

[22] Filed: Sep. 4, 1991

[51] Int. Cl.$^5$ ............................................. F16C 32/06
[52] U.S. Cl. ................................... 384/103; 384/106
[58] Field of Search ............................... 384/103–106, 384/100, 99, 125, 114, 117, 119, 192, 202, 215, 224, 302, 97

[56] References Cited

U.S. PATENT DOCUMENTS

| | | | |
|---|---|---|---|
| 1,349,157 | 8/1920 | Kingsbury | 384/125 |
| 3,151,319 | 9/1964 | Marrs | 384/114 X |
| 3,298,751 | 1/1967 | Elwell | 384/105 |
| 3,424,505 | 1/1969 | Pizzitola | 384/119 |
| 4,170,389 | 10/1979 | Eshel | 384/104 |
| 4,175,800 | 11/1979 | Chaffee et al. | 384/116 |
| 4,526,482 | 7/1985 | Ide | 384/104 |
| 4,647,227 | 3/1987 | Clebant | 384/99 |

FOREIGN PATENT DOCUMENTS 37082 11/1970 Japan .................................. 384/125

Primary Examiner—Thomas R. Hannon

[57] ABSTRACT

A compliant bearing surface supported by an enclosed nearly incompressible fluid is described. A fluid supported compliant bearing surface has the ability to separate out the average load on the bearing surface from the local load variations across the surface. The average load is balanced directly by the supporting fluid leaving the compliant surface in a globally balanced condition and thus a able to readily conform in response to local load variations. A fluid supported compliant bearing surface has excellent compliance coupled with high unit load capacity. The applications include a wide range of bearing types from high pressure gas bearings to ball and socket joints. The fundamental elements of the fluid supported bearing surface are based on observations of nature's optimum design—the intervertebral discs of the spine.

14 Claims, 3 Drawing Sheets

COMPLIANT BEARING SURFACE WITH ENCLOSED FLUID SUPPORT

BACKGROUND OF THE INVENTION

1. Field of the Invention

The present invention generally relates to compliant bearing surfaces.

2. Description of Prior Art

Compliant bearing surfaces are widely used in industry. Applications range from thrust bearings in gas turbines to journal bearings in fans. Compliant bearing surfaces are often found in pressurized gas bearings. A major limitation of prior art compliant bearings is low unit load capacity. Heretofore compliant bearing technology has not been able to deal with applications involving the high pressure such as the crankshaft bearings in a combustion engine which are generally rigid insert bearings or roller bearings.

Typically a fluid lubricated bearing consists of two opposed surfaces separated by a clearance space filled with a fluid lubricant. In many applications, such as gas bearings, the clearance space can be quite small. Even in bearings with clearance spaces on the order of .001 of an inch, the machining and alignment requirements often preclude the use of a rigid bearing surface. Recently gas bearings have been invented with very high load capacity. These bearings include the supersonic bearing, Miyake et al., 4,486,105, and the Fanno line flow bearing, Dunham, pending application 07/674,790. The potential unit loads of these bearings are in the range of a several hundred pounds per square inch or more. Both of these gas bearings require controlling the cross section flow area by systematically varying the clearance gap within the bearing clearance space. The machining costs associated with contouring rigid bearing surfaces are prohibitive due to the very high accuracy required. It would be very advantageous to have a compliant bearing surface that would automatically control the gap across the clearance space of these high pressure gas bearings and which is also capable of sustaining the associated high unit loads.

Compliant bearing surfaces are also used which directly contact another bearing surface in applications such as valve seals and ball and socket joints. Generally these applications use compliant bearings made with elastic materials. However, prior art has failed to the appreciate the advantages of using compliant bearing surfaces with enclosed fluid support.

There many ingenious mechanical means in addition to compliant bearing surfaces which are employed to incorporate flexibility and self alignment into bearing systems. For example, many compliant bearings have a thin metal bearing sheet, a foil, supported by springs. Other foil designs use an elastic material to support the foil. In this type of design there is usually a trade off between compliance and stiffness. An ideal compliant bearing surface would maximize both compliance and stiffness.

It would be very desirable to have a bearing surface which approaches the ideal case of automatically conforming , is globally stiff, durable, and simple to manufacture.

SUMMARY OF THE INVENTION, OBJECTS, AND ADVANTAGES

The present invention is a compliant bearing surface which includes an enclosed fluid support base. The present invention provides a bearing surface which is highly compliant and yet very stiff. It is durable and simple to manufacture.

Nature provides an example of an enclosed fluid supported compliant bearing structure in the intervertebral discs between the vertebrae of the spine. The disks have a soft gelatinous interior surrounded by an annulus of fibrous layers. The fibrous layers are flexible and strong in tension containing the gelatinous nucleus which is pressurized under loading. Conceptually these disk represent an optimum design that can be observed for insights on the structural design of compliant bearings. In this system the interior pressure is transferred to hoop stress in the annulus. The annulus can be viewed as an orthotopic material with high strength in the direction required to resist hoop stress and a curvature which allows deflection to be absorbed in bending. These concepts are included in the present invention.

The improved bearing surface of the present invention has a thin compliant bearing plate with a smooth bearing surface opposite the supported smooth bearing surface. The thin compliant bearing plate is backed by an enclosed nearly incompressible fluid or visco-elastic fluid material. Typically the thin bearing plate overlays a cavity containing the enclosed fluid. The cavity may also contain porous material permeated with fluid. The enclosed fluid provides uniform support of the average load across the thin bearing plate adjacent the fluid. The local variations are absorbed by strains in the thin bearing plate while the average load is supported by the fluid pressure. Conceptually the loading is mechanically separated into local variations and average load. The small local variations will cause the thin bearing sheet to comply. The large average load goes directly into the fluid pressure. Conceptually, the important characteristic is that a static fluid supports only pressure stress. Neglecting the effects of gravity, a pressurized static fluid will exert equal pressure on all portions of the boundary surface. Thus, when the enclosed fluid is nearly incompressible the bearing is globally very stiff.

The present invention includes the various means used to form an enclosed fluid backing the compliant bearing plate. For example, a cavity can be formed by an extension of the bearing plate enclosing the fluid. The cavity may also be formed by the bearing plate over laying a base with pockets. The base can be an elastic or rigid material which transmits the bearing load. The cavity may also be formed by a thin bearing plate overlaying a perforated elastic mat base which in turn overlays a sub-base. The present invention includes a bearing plate backed by an array of adjacent cavities. The present invention includes flat bearing surfaces, curved bearing surfaces, and double curved bearing surfaces. Its applications include journal bearings, thrust bearings, valve seals, and ball and socket bearings. The bearing surface of the present invention can be used in fluid lubricated bearings such a liquid and gas lubricated bearings. The present invention can also be used in sliding contact bearings such as valves. In certain applications such as joints, i.e. natures example, there is no sliding motion across the bearing surface and the freedom of movement depends upon the compliance of the bearing structure. In general the applications of the present invention are extremely broad including nearly all types of bearings.

It is known that the loading on any bearing surface can be represented by a vector force field across the bearing surface. It is also known that this field can, without loss of generality, be decomposed at every point on the surface into two vector force fields, one of which contains only forces normal to the surface and one of which contains only forces parallel to the surface. A static fluid can exert or resist only forces which are normal to its surface where as a moving fluid can exert or resist both normal and tangential forces on a surface. A thin bearing plate can be approximately represented by a surface. The theory which uses this type of representation is known as shell theory. Shell theory is highly developed and mathematically complex. Considering a thin shell with moving fluid on one side and static fluid on the other, it can be seen that the tangential forces on the shell from the moving fluid must go into the shell itself since only normal forces can be resisted by the static fluid. In terms of a fluid supported compliant bearing the thin bearing sheet must absorb and transmit the shear forces from the moving lubricant contacting the bearing surface. For a given span between supports at the edge of the cavity the thickness of the thin sheet required to avoid buckling will increase with increasing tangential loading. It is known that the friction coefficients of gas lubricated bearings are very low and thus the associated tangential forces on the bearing surface will also be low relative to a liquid lubricated bearing. Consequently gas lubricated bearings can have thinner compliant bearing sheets than liquid lubricated bearings. As previously mentioned, the static fluid in the cavity can absorb the average normal loading on the thin bearing plate since the pressure in the cavity will be nearly uniform throughout the cavity. If the variation in the pressure across the bearing surface opposite the cavity from the moving lubricants is small then the bulk of the load will be transmitted into pressure in the cavity. The variations of the normal loading from the average will be transmitted into the thin bearing sheet. These variations will cause the sheet to comply. However, deflection of bearing sheet affects the clearance gap which in turn affects the flow stream, and hence the loading. Thus, the compliance of the bearing surface can also be utilized control the flow stream of the lubricant. This aspect is particularly relevant in high pressure gas lubricated bearings where control of the character of the flow is essential to proper operation.

The response of the fluid pressure in the cavity to a change in average load can be very quick. This is because the cavity fluid can be selected so that the velocity of pressure waves in the cavity fluid travel much faster than the disturbances to the thin bearing sheets. The viscosity and compressibility of the fluid in the cavity are important parameters with respect to the response to pressure changes. High viscosity increases damping, which can be desirable for suppressing vibration. Compressibility affects wave speed and the stiffness of the support. In certain applications, such as nature's example, it is desirable to use a fluid which is gelatinous, highly viscous or visco-elastic. In these applications it is generally desirable to slow the response of the bearing surface or provide a variation in response characteristics as a function of frequency, or rapidity, of the changes in the loading across the bearing surface.

The bearing surface assembly of the present invention is usually at least one of two bearing surfaces intended to be placed opposite one another, sometimes separated by a clearance space filled with fluid lubricant. The two surfaces generally move relative to each other within a specified range of motions, velocities, and loads. In fluid lubricated bearings, fluid lubricant is provided to the clearance space often through openings in the bearing surface. Regulation is often provided by orifices or narrow passages upstream of the openings in the bearing surfaces. The present invention includes all the various combinations of bearing surface geometries, groove patterns, recesses, openings, relief channels, and orifice passages that are part of a bearing surface assembly.

The present invention includes a bearing surface which can control cross sectional flow area by automatically varying the clearance gap along the flow path in response to local pressure variations within the bearing. This feature is very useful for constructing high unit load gas bearings which require varying the clearance gap in order to control the character of the gas flow. The conceptually simplest way to narrow the clearance gap along the flow path is to contour the bearing surface. However, systematically contouring for a rigid high pressure gas bearing surface requires great accuracy in dimensional control during manufacture. Also, rigid contoured bearing surfaces only work as designed when the bearing is near the nominal design position. The machining and support requirements of a high load gas bearing surface can be greatly relaxed by using a flexible or compliant bearing surface. In fact the use of compliant bearing surfaces are an essential part of making high pressure gas bearings commercially viable. Additionally, high pressure gas bearing surfaces must be capable of sustaining high unit loading. The fluid supported compliant bearings of the present invention are capable of supporting very average high unit loads and at the same time are highly compliant with regards to variations in the local loading across the bearing surfaces. Compliant bearing surfaces with these and other capabilities are included in the present invention.

As previously mentioned, the compliant bearing surfaces of the present invention are essential to extending the applications for gas lubricated bearings. Often oil lubricated bearings can be replaced by high unit load gas bearings. Shifting to gas lubricated bearings from oil lubricated bearings has environmental consequences by reducing the demand for oil and the need to process waste oil. This is an area which is addressed by the present invention.

Dynamic effects are an important consideration in designing compliant bearings. In a given application, such as a journal bearing, the supported surfaces may move across the bearing surface in a certain range of velocities. The velocities and the characteristic lengths of the surface variations define a frequency range. Thus maintaining operating clearance in each local region of the bearing requires consideration of both spacial and frequency response of the bearing surface. These considerations can be appreciated by examining the analytical solutions for flexural waves in elastic beam with various types of support. Of particular interest is a simple beam supported on a visco-elastic base discussed in Chapter Three of "Wave Motions in Elastic Solids", K. F. Graff, Ohio State press. The propagation of harmonic flexural waves for the two dimensional case is treated. For small deformations without an elastic base the waves propagate at a constant velocity. Adding the elastic base results in the propagation velocities varying with wave frequency which results in dispersion. Also there is a certain frequency called the cutoff frequency below which no waves propagate. Consideration of a moving point load leads to a velocity which is critical. The deformation caused by the moving load takes on approximately the shape that a non moving load would produce at a velocity of about half of critical velocity. The deformation lags the load at speeds higher than the critical velocity. At speeds near the critical velocity large deformations can occur. The concepts revealed by these simple cases are very useful in tuning the compliant surface to the particular application. With finite element methods the behavior of the simple cases can be extended to complex geometries and materials providing a basis for design.

The load capacity of a fluid backed compliant bearing surface can be very high with proper design. As previously mentioned, nature's example of a containment structure, which has approximately a flat oval cross section, is an optimum design in which the pressure in the cavity is transmitted into hoop stress in the curved portion of the containment structure. A containment structure with a flat oval cross section, or a portion of a flat oval, is very efficient. At the edge of the flat portion there is good compliance in the normal direction. The curved portion allows normal deflection at edge of the flat portion of the containment structure to be absorbed in bending. Interior pressure in the curved portion is transformed into hoop stress which places the flat portion in tension resisting buckling.

The variety of designs which are included in the present invention are broad. While the invention is described in detail, variations and modifications will occur to those skilled art once they are familiar with the basic concepts of the present invention. The present invention includes all such variations and modifications as fall within the spirit and scope of the invention - a compliant bearing surface supported by an enclosed nearly incompressible fluid.

DESCRIPTION OF THE PREFERRED EMBODIMENT

Figure 1:
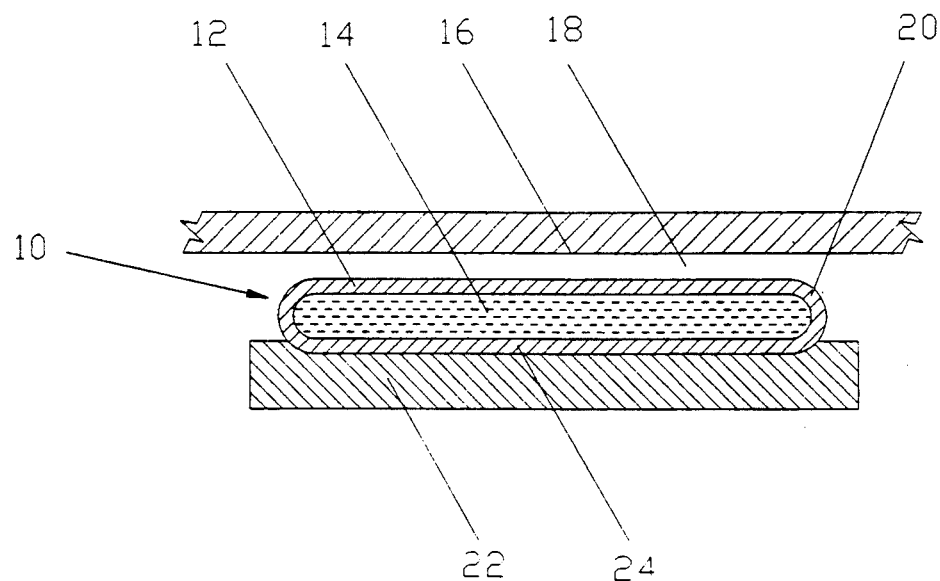
FIG. 1 is a section view of a fluid supported compliant bearing surface of the present invention with a flat oval containment structure.

Referring to FIG. 1, a compliant fluid supported bearing surface assembly (10) with a flat oval containment structure (12,20,24) is shown. The dimensions are exaggerated for clarity. The containment structure (12,20,24) consists of a thin walled metal vessel with an approximately flat oval cross section. The compliant smooth bearing surface (12) includes the flat portion of the flat oval of the containment structure (12,20,24) adjacent the clearance space (18). The clearance space (18) is filled with fluid lubricant. The supported smooth bearing surface (16) is adjacent the clearance space (18) opposite the compliant bearing surface (12). The containment structure (12,20,24) encloses a cavity filled with a nearly incompressible fluid material (14). The bottom region of the containment structure (24) is adjacent the rigid base (22). The end regions of the containment structure (20) are curved. In operation, the curvature allows normal deflections at the edge of the flat portion of the compliant bearing surface (12) to be absorbed in bending in the end region of the containment structure (20). Pressure in the enclosed fluid material (14) is transmitted into hoop stress in the curved portion of the containment structure (20) and applies tension to the compliant bearing surface (12). During operation the supported smooth bearing surface (16) is moving relative to the compliant bearing surface (12). The supported bearing surface is (16) supported by the pressure of the fluid in the clearance space (18). Means, not shown, are provided to supply fluid lubricant to and from the clearance space (18). The load on the compliant bearing surface (12) is from the lubricating fluid in the clearance space (18). The pressure in the clearance space (18) will in generally vary across the bearing surface as function of time and position causing the compliant bearing surface (12) to comply and thus vary the gap across clearance space (18). The average normal load on the compliant bearing surface (12) is transmitted into pressure in the enclosed fluid (14).

Figure 2:
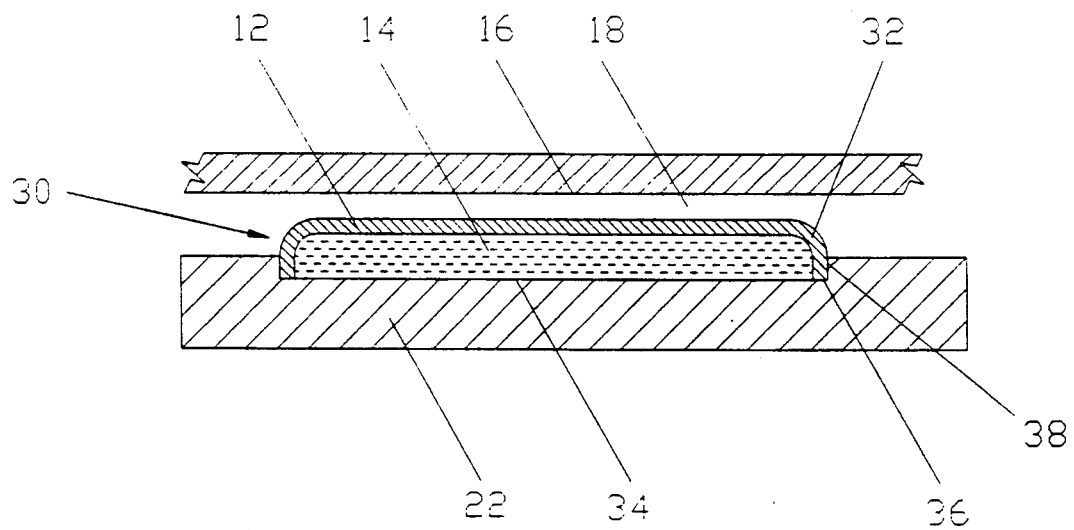
FIG. 2 is a section view of a fluid supported compliant bearing surface of the present invention with a half flat oval pocket containment structure.

Referring to FIG. 2, a compliant fluid supported bearing surface assembly (30) with a partial flat oval containment structure is shown. The dimensions are exaggerated for clarity. The containment structure consists of a thin walled vessel (12,32) with half of an approximately flat oval cross section embedded in a recessed cavity (34) in the base (22). The thin walled vessel (12,32) and base (22) enclose a region filled with a nearly incompressible fluid material (14). The enclosed fluid material (14) is nearly incompressible. The ends of the thin walled vessel (36,38) adjoin the base (22) sealing the cavity (34). The compliant smooth bearing surface (12) includes the flat portion of the partial flat oval of the thin walled vessel (12,32) adjacent the clearance space (18). The clearance space (18) is filled with fluid lubricant. The supported smooth bearing surface (16) is adjacent the clearance space (18) opposite the compliant bearing surface (12). In operation, normal deflections at the edge of the flat portion of the compliant bearing surface (12) are absorbed in bending in the curved portion of the thin walled vessel (32). Pressure in the enclosed fluid material (14) is transmitted in to hoop stress in the curved portion of the thin walled vessel (32) and applies tension to the compliant bearing surface (12). During operation, the supported bearing surface (16) is moving relative to the compliant bearing surface (12). The supported smooth bearing surface is (16) supported by the pressure of the fluid in the clearance space (18). Means, not shown, are provided to supply fluid lubricant to and from the clearance space (18). The load on the compliant bearing surface (12) is from the lubricating fluid in the clearance space (18). The pressure in the clearance space (18) will in generally vary across the compliant bearing surface (12) as function of time and position causing the surface to comply and thus vary the gap across clearance space (18). The average normal load on the compliant bearing surface (12) is transmitted into pressure in the enclosed fluid material (14).

Figure 3:
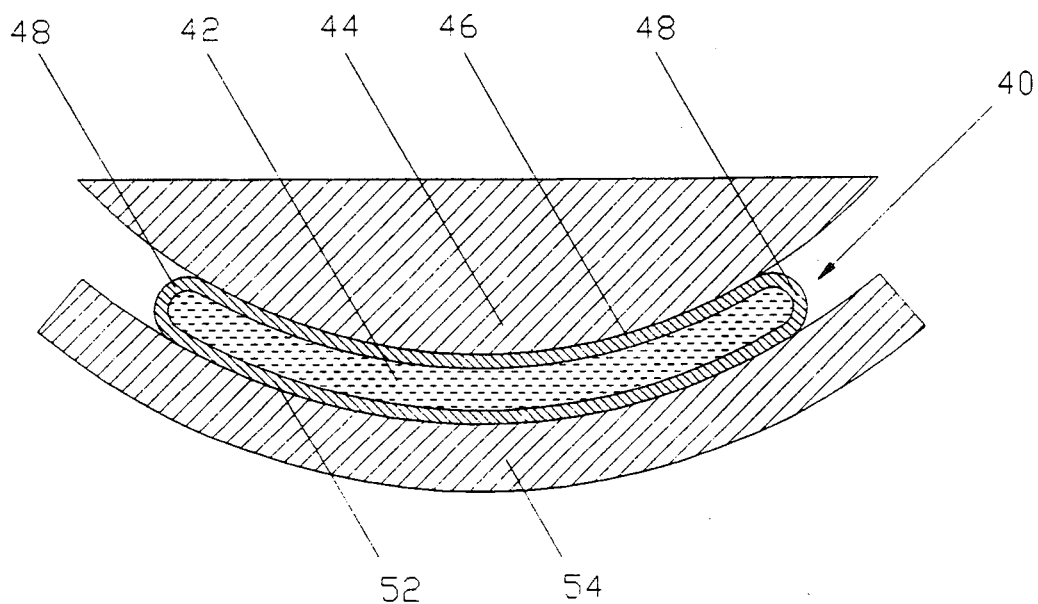
FIG. 3 is a section view of a fluid supported compliant bearing surface of the present invention with a curved oval containment structure in direct contact with the supported bearing surface.

Referring to FIG. 3, a compliant fluid supported bearing surface assembly (40) with a curved oval containment structure (46,48,52) is shown. The dimensions are exaggerated for clarity. The containment structure (46,48,52) consists of a thin walled metal vessel with an approximately curved oval cross section. The compliant smooth bearing surface (46) includes the long radius curved portion of the containment structure (46,48,52) adjacent the supported smooth bearing surface (44) opposite the compliant bearing surface (46). The containment structure (46,48,52) encloses a cavity filled with a nearly incompressible fluid material (42). The bottom region of the containment structure (52) is adjacent the rigid base (54). The end regions of the containment structure (48) have short radius curvature. In operation, the curvature of the end regions (48) allows normal deflections at the edge of the long radius curved portion of the compliant bearing surface (46) to be absorbed in bending in the end regions of the containment structure (48). Pressure in the enclosed fluid material (42) is transmitted into hoop stress in the end regions of the containment structure (48) and applies tension to the compliant bearing surface (46). During operation the supported smooth bearing surface (44) may be static or moving relative to the compliant bearing surface (46). The supported bearing surface is (44) supported smooth by contact with the compliant bearing surface (46). The compliant bearing surface (46) conforms to the shape of the supported bearing surface (44) matching the imperfections and local variations, not shown, in the supported bearing surface (44). The average normal load on the compliant bearing surface (46) is transmitted into pressure in the enclosed fluid (42).

Figure 4:
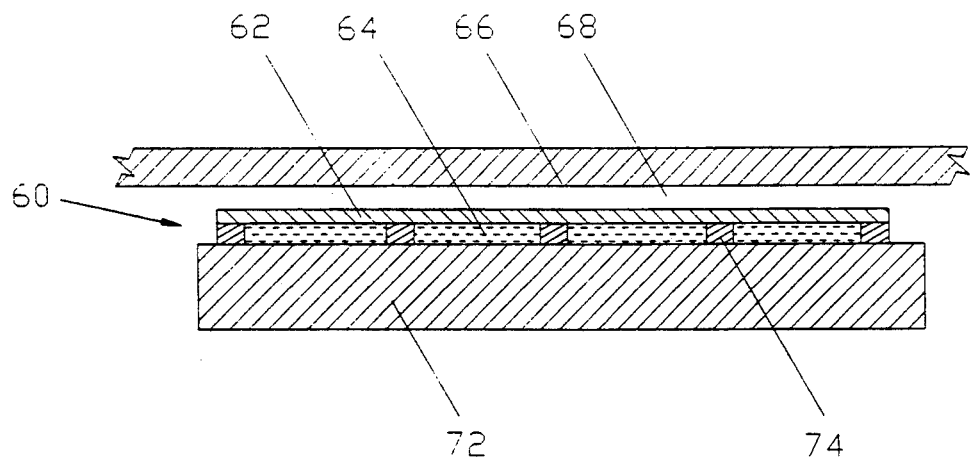
FIG. 4 is a section view of a fluid supported compliant bearing surface of the present invention with a compliant bearing plate overlaying a perforated elastic base.

Referring to FIG. 4, a compliant fluid supported bearing surface assembly (60) with a compliant smooth bearing surface (62) overlaying a perforated elastic base (74) is shown. The dimensions arte exaggerated for clarity. The perforated elastic base (74) overlays a rigid sub-base (72). The compliant bearing surface (62), the perforated elastic base (74), and the sub-base (72) form a containment structure enclosing a multiplicity of cavities filled with a nearly incompressible fluid (64). The compliant bearing surface (62) is adjacent the clearance space (68). The clearance space (68) is filled with fluid lubricant. The edges of the elastic base (74) adjoining the sub-base (72) and the compliant bearing surface (62) are treated with and adhesive sealing the cavities (64) and attaching the elastic base (74) to the compliant bearing surface (62) and the rigid sub-base (72). The supported smooth bearing surface (66) is adjacent the clearance space (68) opposite the compliant bearing surface (62). In operation the supported smooth bearing surface (66) is moving relative to the compliant bearing surface (62). The supported bearing surface is (66) supported smooth by the pressure of the lubricating fluid in the clearance space (68). Means, not shown, are provided to supply fluid lubricant to and from the clearance space (68). The load on the compliant bearing surface (62) from the lubricating fluid in the clearance space (68). The pressure in the clearance space (68) will in generally vary across the bearing surface as function of time and position causing the compliant bearing surface (62) to comply and thus vary the gap across clearance space (68). The average normal load on the compliant bearing surface (62) is transmitted into pressure in the nearly incompressible fluid in the cavities (64).

Figure 5:
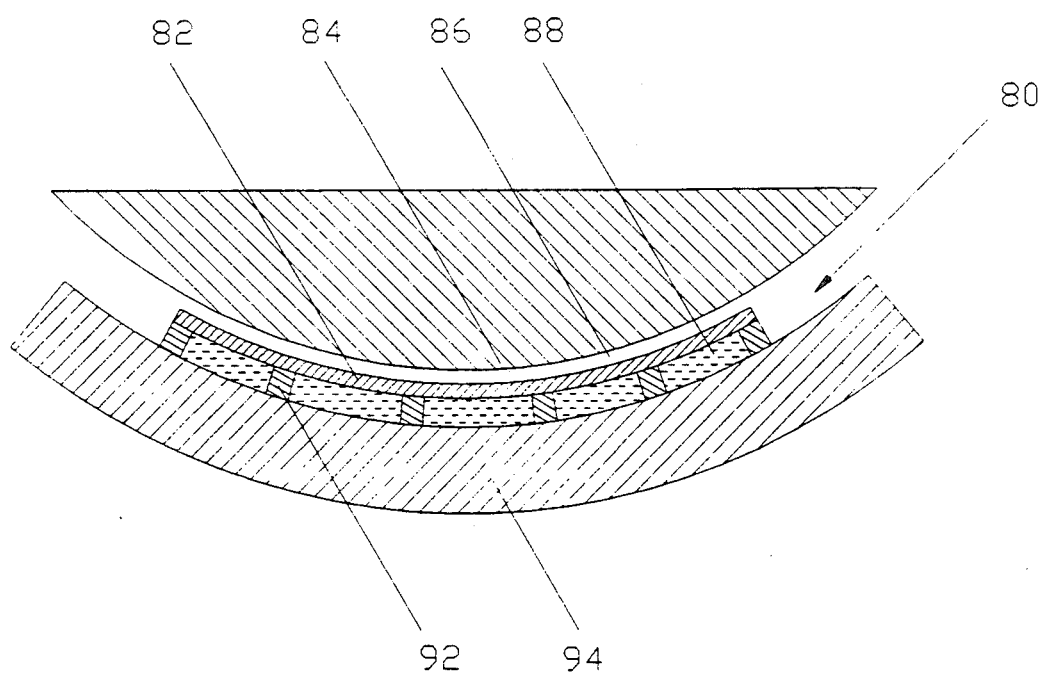
FIG. 5 is a section view of a curved fluid supported compliant surface of the present invention with a compliant bearing plate overlaying a perforated elastic base.

Referring to FIG. 5, and adaption of the aforementioned compliant bearing surface overlaying a perforated elastic base for a curved bearing surface is shown.

The present invention also includes the variations previously described wherein the enclosed nearly incompressible fluid material (14,42,64,88) includes a compliant porous material permeated with a nearly incompressible fluid (14,42,64,88).

The present invention also includes the variations to the previously described embodiments (10,30,60,80) of FIG. 1,2,3, and 5 wherein there is no clearance gap (18,68,86) and the supported bearing surface (16,44,66,84) is in contact with the compliant bearing surface (12,46,62,82) as is shown in the embodiment (40) of FIG. 4. The present invention also includes the variations to the previously described embodiment FIG. 4 wherein there is a clearance gap (18,68,86) and the supported bearing surface (16,44,66,84) is not in contact with the compliant bearing surface (12,46,62,84) as is shown in the embodiments (10,30,60,80) of FIG. 1,2,3 and 5.

The present invention also includes the variations to the previously described embodiments wherein there is little or no relative motion between the supported bearings surface (16,44,66,84) and the compliant bearing surface (12,46,62,82).

The physics of compliant bearing surfaces is complex. The brief physical explanation given is believed to be accurate. However, it should not be construed as binding or complete.

Although the foregoing invention has been described in some detail with illustrations for clarity, it will be obvious that certain changes and modifications may be practiced within the scope of the appended claims.

What is claimed is:

1. An improved bearing surface assembly, said improvement comprising a compliant bearing plate, a nearly incompressible fluid, an elastic base with at least one perforation, and a subbase, said compliant bearing plate overlaying said perforated elastic base overlaying said sub-base enclosing at least one cavity, said cavity filled with said nearly incompressible fluid, said nearly incompressible fluid in said cavity and said elastic base a support means for said compliant bearing plate.

2. An improved bearing surface assembly as in claim 1 wherein said nearly incompressible fluid is a viscoelastic fluid material.

3. An improved bearing surface assembly as in claim 1 wherein said nearly incompressible fluid is a gelatinous material.

4. An improved bearing surface assembly as in claim 1 wherein said cavity contains a porous material permeated with said nearly incompressible fluid, said porous material and said incompressible fluid filling said cavity, said porous material in said cavity a support means for said compliant bearing plate.

5. An improved bearing assembly, said improvement comprising
at least one compliant smooth bearing plate,
a supported smooth bearing surface,
a nearly incompressible fluid,
and at least one flat oval containment structure,
said containment structure a thin walled vessel having approximately a flat oval shape in a least one cross section,
said compliant bearing plate the flat portion of said containment structure,
said containment structure enclosing at least one cavity filled with said nearly incompressible fluid,
said cavity adjacent said compliant bearing plate,
said nearly incompressible fluid and the curved end regions of said flat oval of said containment structure a support means for said compliant bearing plate, said supported smooth bearing surface separate from and opposed to said compliant bearing plate,
said compliant bearing plate a non-attached support means for said supported smooth bearing surface.

6. An improved bearing assembly as in claim 5 wherein said nearly incompressible fluid is a visco-elastic fluid material.

7. An improved bearing assembly as in claim 5 wherein said nearly incompressible fluid is a gelatinous material.

8. An improved bearing assembly as in claim 5 wherein said containment structure contains a porous material permeated with said nearly incompressible fluid, said porous material and said incompressible fluid filling said cavity, said porous material in said cavity a support means for said compliant bearing plate.

9. An improved bearing assembly as in claim 5 wherein said supported bearing surface and said compliant bearing plate are separated by a clearance space filled with a fluid lubricant.

10. An improved bearing assembly, said improvement comprising
at lest one compliant smooth curved bearing plate,
a supported curved smooth bearing surface,
a nearly incompressible fluid,
and at lest one curved oval containment structure,
said containment structure a thin waled vessel having approximately a curved flat oval shape in a least one cross section,
said compliant curved smooth bearing plate a portion of said curved oval containment structure opposing said supported curved smooth bearing surface,
said containment structure enclosing at least one cavity filled with said nearly incompressible fluid,
said cavity adjacent said compliant bearing plate,
said nearly incompressible fluid and the short radius end regions of said curved oval of said containment structure a support means for said compliant bearing plate,
said supported curved smooth bearing surface separate from and opposed to said compliant curved smooth bearing plate,
said compliant curved smooth bearing plate a non-attached support means for said supported curved smooth bearing surface.

11. An improved bearing assembly as in claim 10 wherein said nearly incompressible fluid is a visco-elastic fluid material.

12. An improved bearing assembly as in claim 10 wherein said nearly incompressible fluid is a gelatinous material.

13. An improved bearing assembly as in claim 10 wherein said containment structure contains a porous material permeated with said nearly incompressible fluid, said porous material and said incompressible fluid filling said cavity, said porous material in said cavity a support means for said compliant bearing plate.

14. An improved bearing assembly as in claim 10 wherein said supported bearing surface and said compliant bearing plate are separated by a clearance space filled with a fluid lubricant.

* * * * *